June 2, 1942.  C. M. THOMPSON  2,285,315
INSERTED SECTION SAW
Filed March 29, 1941
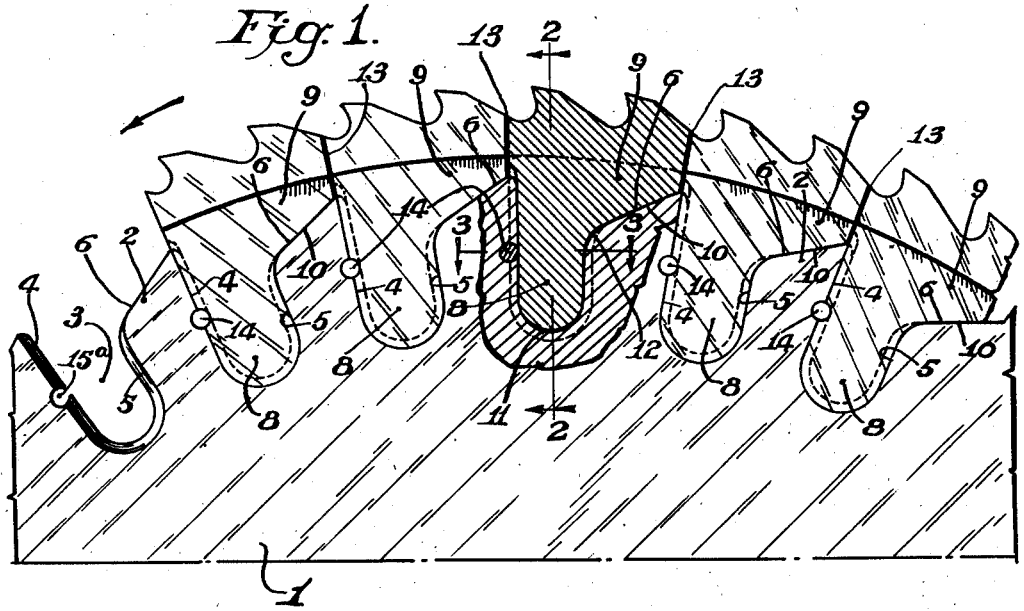
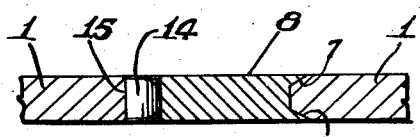
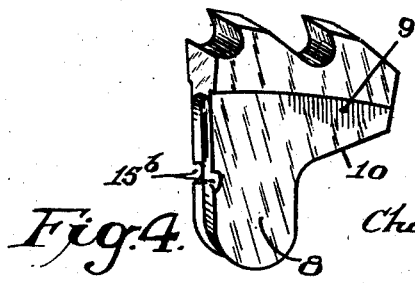
Inventor:—
Charles M. Thompson
by his Attorneys
Howson & Howson Patented June 2, 1942

2,285,315

UNITED STATES PATENT OFFICE 2,285,315

INSERTED SECTION SAW

Charles M. Thompson, Merion, Pa., assignor to Henry Disston & Sons, Incorporated, Tacony, Pa., a corporation of Pennsylvania Application March 29, 1941, Serial No. 385,924

2 Claims. (Cl. 143—141)

This invention relates to improvements in saws of the inserted tooth section type, and more particularly to circular saws of this type designed for cutting metals.

One object of the invention is to provide a saw of the stated type in which the inserted sections form a substantially continuous rim at the edge of the blade, said rim being unbroken by wedges or other locking devices.

Another object of the invention is to provide a saw of the stated type designed so that the resultant thrust imposed upon the inserted tooth sections when cutting shall in each instance be transmitted to the blade through a primary thrust shoulder on the latter arranged approximately at right angles to the direction of said transmitted thrust whereby tendency of the thrust to displace the tooth angularly in the blade is reduced to a practical minimum.

Still another object is to provide a saw of the stated type wherein provision is made for insuring a positive seating of the inserted sections on the aforesaid thrust shoulder, and wherein further the said inserted sections are independently supported in the blade and may be individually withdrawn without affecting the companion sections.

The invention further resides in certain structural details hereinafter described which operate to strengthen and to preclude breakage of the blade and of the inserted tooth sections; to maintain the inserted sections in solid engagement with the blade; and in other respects to afford a generally improved blade structure.

In the attached drawing:

Figure 1 is a side view, partly in section, of a segment of a circular saw made in accordance with my invention;

Fig. 2 is a section on the line 2—2, Fig. 1;

Fig. 3 is a section on the line 3—3, Fig. 1, and

Fig. 4 is a view in perspective of one of the inserted tooth sections.

With reference to the drawing, the saw comprises a blade 1 which, in the present instance, is in the form of a disk. The blade 1 has at the periphery thereof a series of projections 2, with intervening gullets 3 adapted for reception of the inserted tooth sections. In operation, the blade is adapted to turn in the direction indicated by the arrow in Fig. 1, and in the present instance, the trailing edge 4 of each of the projections 2 extends radially with respect to the center of the blade. The leading edge 5 of each of the projections 2 is substantially parallel to the trailing edge 4 of the immediately leading projection, whereby the opposite side edges of the intervening gullet 3 are substantially parallel. The outer end edge 6 of each of the projections 2 is inclined to the outer circumferential line or periphery of the blade 1 defined by the extreme outer ends of the projections, and the said edge 6 inclines inwardly of the blade toward the leading edge 5 of the projection. Both the trailing edge 4 and the leading edge 5 of the projection are beveled at the opposite sides of the blade, as indicated at 7 in Fig. 2.

The inserted tooth sections each comprises a shank 8 which, in assembly, is closely confined between the opposite side edges of the gullet 3. The section further comprises a trailing portion 9 having an inner extended edge 10 which, in assembly, is adapted to seat solidly upon the inclined end edge or shoulder 6 of the rearwardly adjoining projection 2. The arrangement is such that when the shank 8 of the projection is confined between the edge of the gullet 3, the inner edge 10 of the trailing portion 9 will lie in parallel relation with the inclined edge 6 of the projection, and sufficient clearance is provided between the inner end of the shank 8 and the bottom of the gullet 3, as indicated at 11 in Fig. 1, to insure a proper solid seating of the edge 10 upon the shoulder 6. Preferably the side edges of the gullets are slightly tapered so that the tooth sections must be driven into place in order to bottom the section on the shoulder 6.

It will be noted that the juncture between the leading edge 5 of the projection and the inclined outer end edge 6 is rounded, and that a similar rounded juncture is provided between the trailing edge of the shank 8 and the seating surface 10 of the inserted section. Preferably, and as shown in Fig. 1, the arcs of these junctures are formed relatively so as to provide a slight clearance, as indicated at 12. Also the inserted sections are formed so that while the sections collectively form a substantially continuous band at the periphery of the blade 1, there will be a slight clearance between the adjoining sections, as indicated at 13.

The individual sections are positively anchored in the blade by means of a rivet 14 which, after insertion of the tooth sections in the gullets, is entered into rivet holes 15 formed in part in the trailing edge of the several projections and in the leading edges of the inserts, the segmental openings 15a and 15b which jointly constitute said holes being arranged so that they register when the sections are fully entered in the gullets, Preferably the openings are relatively positioned in the respective parts so that when the rivet is driven, the insert is drawn tightly into the gullet and against the shoulder formed by the inclined surface 6 of the projection.

It will be apparent that by reason of the clearances 11 and 12, the inserted sections must seat solidly against the inclined shoulder 6 at the outer ends of the projections 2. In accordance with the invention, this shoulder in each instance is arranged so that it will lie approximately at right angles to the direction in which the thrust imposed upon the associated inserted tooth section, when cutting, is transmitted to the blade. Thus the major tendency of the thrust is to force the blade section more solidly against the shoulder 6, and the tendency of the thrust to displace the sections angularly with respect to the blade is reduced to a minimum. I have found that in this respect, the included angle between the shoulder 6 and the adjoining leading edge of the projection should be within the range of from about 100° to about 120°, the best average results being obtainable with an angle of approximately 110°.

The provision of clearance between the adjoining inserted sections renders the sections entirely independent of each other, and gives assurance that the thrust of each inserted section shall be taken by the blade primarily through the associated shoulder 6. By reason, also, of this clearance, the tooth sections may be individually withdrawn from the blade and replaced without disturbing the companion sections. It is to be noted that the design eliminates all sharp corners, both in the sockets and in the inserted tooth sections, which corners might tend to initiate cracks in the blade or in the tooth sections under working conditions.

While in the illustrated embodiment I have shown the respective tooth sections as provided with two cutting teeth, it will be understood that the sections may comprise a single tooth, or more than two, without departure from the invention.

I claim:

1. In a circular saw, a disk blade having at the peripheral edge thereof a series of projections with intervening gullets, the outer end edge of each projection being inclined to the peripheral edge of the blade and inwardly toward the leading edge of said projection, a tooth section inserted in each of said gullets, said sections collectively forming a substantially continuous peripheral band on the blade and being formed to provide a slight clearance between the adjoining sections, said tooth section comprising a shank closely fitted and confined between the opposite side edges of the gullet and spaced from the bottom of said gullet, and comprising also a trailing portion having an inner extended edge paralleling and solidly seated upon the said inclined outer edge of the rearwardly adjoining projection, said inclined edge being disposed approximately at right angles to the direction in which the resultant thrust imposed upon the tooth section when cutting is transmitted to the blade.

2. In a circular saw, a disk blade having at the peripheral edge thereof a series of projections with intervening gullets, the trailing edge of each of said projections extending substantially radially with respect to the center of the blade and the leading edge of said projection being substantially parallel with the trailing edge of the proximate projection, the outer end edge of said projection forming with said leading edge an included angle of approximately 110°, a tooth section inserted in each of said gullets, said section comprising a shank closely fitted and confined between the substantially parallel opposite side edges of the gullet and comprising also a trailing portion having an inner extended edge parallel to and solidly seated upon the said inclined outer edge of the rearwardly adjoining projection, the shank of said tooth section clearing the bottom of said gullet and the said trailing portion of the tooth section extending into close proximity but clearing the forward edge of the rearwardly adjoining tooth section.

CHARLES M. THOMPSON.